United States Patent [19]

Thorn

[11] Patent Number: 4,965,030

[45] Date of Patent: Oct. 23, 1990

[54] METHOD OF FORMING A COMPRESSION MOLDED DOOR ASSEMBLY

[75] Inventor: John E. Thorn, Sylvania, Ohio

[73] Assignee: Therma-Tru Corp., Toledo, Ohio

[21] Appl. No.: 363,603

[22] Filed: Jun. 8, 1989

Related U.S. Application Data

[62] Division of Ser. No. 207,173, Jun. 15, 1988, Pat. No. 4,860,512.

[51] Int. Cl.[5] .................... B29C 67/22

[52] U.S. Cl. .................... 264/46.5; 264/46.6; 264/328.12; 425/812

[58] Field of Search .................... 264/46.5, 46.6, 328.12; 425/812

[56] References Cited

U.S. PATENT DOCUMENTS

| | | | |
|---|---|---|---|
| 751,435 | 2/1904 | Ohnstrand | 52/455 |
| 956,556 | 5/1910 | Wege | 52/455 |
| 1,249,814 | 12/1917 | Otte | 52/455 |
| 2,557,412 | 6/1951 | Clements | 52/803 |
| 2,653,139 | 9/1953 | Sterling | 425/812 |
| 2,849,758 | 9/1958 | Plumley et al. | 20/15 |
| 2,871,056 | 1/1959 | Levitt | 296/106 |
| 2,890,977 | 6/1959 | Bayer et al. | 154/110 |
| 2,924,851 | 2/1960 | Birckhead, Jr. et al. | 425/812 |
| 2,924,860 | 2/1960 | Parham, Jr. et al. | 20/35 |
| 2,924,861 | 2/1960 | Viets | 264/46.5 |
| 3,153,817 | 10/1964 | Pease, Jr. | 20/35 |
| 3,177,271 | 4/1965 | Slayman | 264/46.5 |
| 3,225,505 | 12/1965 | Lytz | 20/35 |
| 3,250,041 | 5/1966 | Anger | 49/501 |
| 3,299,595 | 1/1967 | Munk | 52/309 |
| 3,402,520 | 9/1968 | Lee et al. | 52/309.6 |
| 3,498,001 | 3/1970 | MacDonald | 49/501 |
| 3,512,304 | 5/1970 | Meuret | 49/501 |
| 3,546,841 | 12/1970 | Smith et al. | 52/309 |
| 3,593,479 | 7/1971 | Hinds | 52/313 |
| 3,616,116 | 10/1971 | McDonald | 161/39 |
| 3,772,241 | 11/1973 | Kroekel | 260/40 R |
| 3,883,612 | 5/1975 | Pratt et al. | 260/862 |
| 3,950,894 | 4/1976 | DiMaio | 49/501 |
| 3,961,012 | 6/1976 | DiMaio | 264/257 |
| 4,022,644 | 5/1977 | Smith, Jr. | 156/79 |
| 4,132,042 | 1/1979 | DiMaio | 52/309.1 |
| 4,152,876 | 5/1979 | Seely | 52/455 |
| 4,265,067 | 5/1981 | Palmer | 52/309.9 |
| 4,311,183 | 1/1982 | Herbst et al. | 160/37 |
| 4,374,693 | 2/1983 | Pitt | 156/267 |
| 4,420,922 | 12/1983 | Wilson | 52/791 |
| 4,429,493 | 2/1984 | St. Aubin | 49/367 |
| 4,496,201 | 1/1985 | Allgeyer | 312/296 |
| 4,546,585 | 10/1985 | Governale | 52/309.11 |
| 4,550,540 | 11/1985 | Thorn | 52/309.4 |
| 4,635,421 | 1/1987 | Newberg | 52/309.11 |
| 4,720,951 | 1/1988 | Thorn et al. | 52/208 |
| 4,724,115 | 2/1988 | Freeman | 425/812 |
| 4,740,346 | 4/1988 | Freeman | 264/328.12 |
| 4,746,383 | 5/1988 | Bacon et al. | 264/46.5 |
| 4,805,293 | 2/1989 | Buchser | 264/46.6 |

FOREIGN PATENT DOCUMENTS

| | | | |
|---|---|---|---|
| 898855 | 5/1984 | Belgium . | |
| 2258510 | 8/1975 | France | 52/309.9 |
| 2304763 | 11/1976 | France . | |
| 462428 | 12/1951 | Italy . | |
| 551432 | 5/1977 | U.S.S.R. . | |
| 604937 | 4/1978 | U.S.S.R. . | |
| 1420244 | 1/1976 | United Kingdom . | |
| 1487309 | 9/1977 | United Kingdom . | |
| 2044316 | 10/1980 | United Kingdom . | |
| 2057037 | 3/1981 | United Kingdom . | |

*Primary Examiner*—David Simmons
*Assistant Examiner*—Allan R. Kuhns
*Attorney, Agent, or Firm*—Emch, Schaffer, Schaub & Porcello Co.

[57] ABSTRACT

A door assembly having compression molded skins and compression molded panel. The panel may be molded with one of the skins or molded separately. The surfaces of the panel and a surface of each of the skins have a textured pattern which simulates the grain and texture of a wood door. A core is positioned between said skins. The construction of the skins permits effective introduction of foam to form the core therebetween following assembly of the skins.

4 Claims, 2 Drawing Sheets

METHOD OF FORMING A COMPRESSION MOLDED DOOR ASSEMBLY

This is a divisional of co-pending application Ser. No. 07/207,173 filed on Jun. 15, 1988, now U.S. Pat. No. 4,860,512.

BACKGROUND OF THE INVENTION

The present invention relates to a compression molded door assembly. Compression molded door assemblies comprise a separate class of doors. A prior art compression molded door assembly is disclosed in my U.S. Pat. No. 4,550,540, which was granted Nov. 5, 1985.

Compression molded door assemblies include outer compression molded door skins which have a textured pattern on the outer side of one or both skins which simulates, for example, grain and texture of a wood door. Frequently, they also include a layer of insulation between the skins.

The compression molded door assemblies are often superior to a wood door in that they have dimensional stability which resists excessive deflection and warping caused by temperature and humidity differentials.

SUMMARY OF THE INVENTION

The present invention is directed to a compression molded door assembly having one or more central panels formed of a single compression molded door skin. The door has insulation in areas other than the central panel or panels. The outer sides of the compression molded skins define a textured pattern simulating the grain and texture of a wood door. A method for manufacturing compression molded door assembly with insulation in areas other than the central panel or panels is also disclosed.

The primary object of the present invention is to provide a compression molded door assembly that is both attractive and also has strength and dimensional stability.

Another object of the present invention is to provide a door assembly which is simple and economical to manufacture.

A further object of the present invention is to provide a door assembly which can utilize a number of different central panel configurations.

Finally, it is an object of the present invention to provide a method for manufacturing a compression molded door assembly.

Other objects and advantages will become apparent from the description and drawings.

DETAILED DESCRIPTION OF THE DRAWINGS

DETAILED DESCRIPTION OF THE PREFERRED EMBODIMENT

Figure 1:
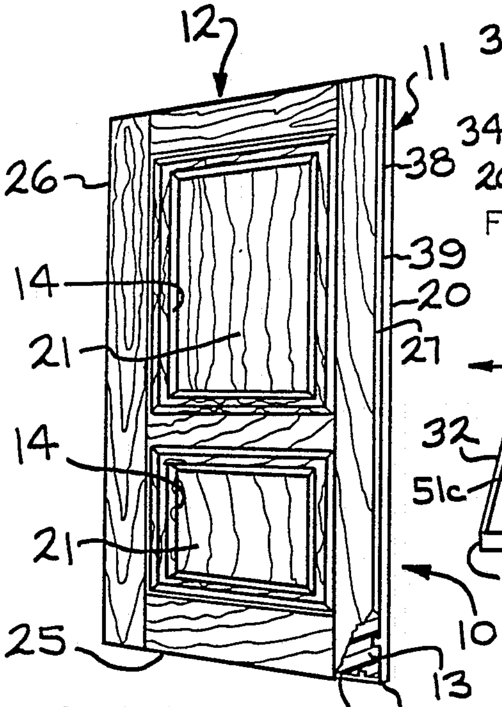
FIG. 1 is an elevational view of a compression molded door assembly, according to the present invention.

A compression molded door assembly, according to the present invention, is generally indicated by the reference number 10 in FIG. 1. The compression molded door assembly 10 includes a pair of opposed compression molded door skins 11 and 12. The interior of door assembly 10 is filled with a foamed core 13 but may be filled with one of many different types of materials including fibrous glass insulation blanket, rigid formed expanded fibrous glass insulation members, or loose fibrous glass insulation particles. As will be readily appreciated, the door assembly of the present invention is especially well-suited for a foam core.

Figure 2:
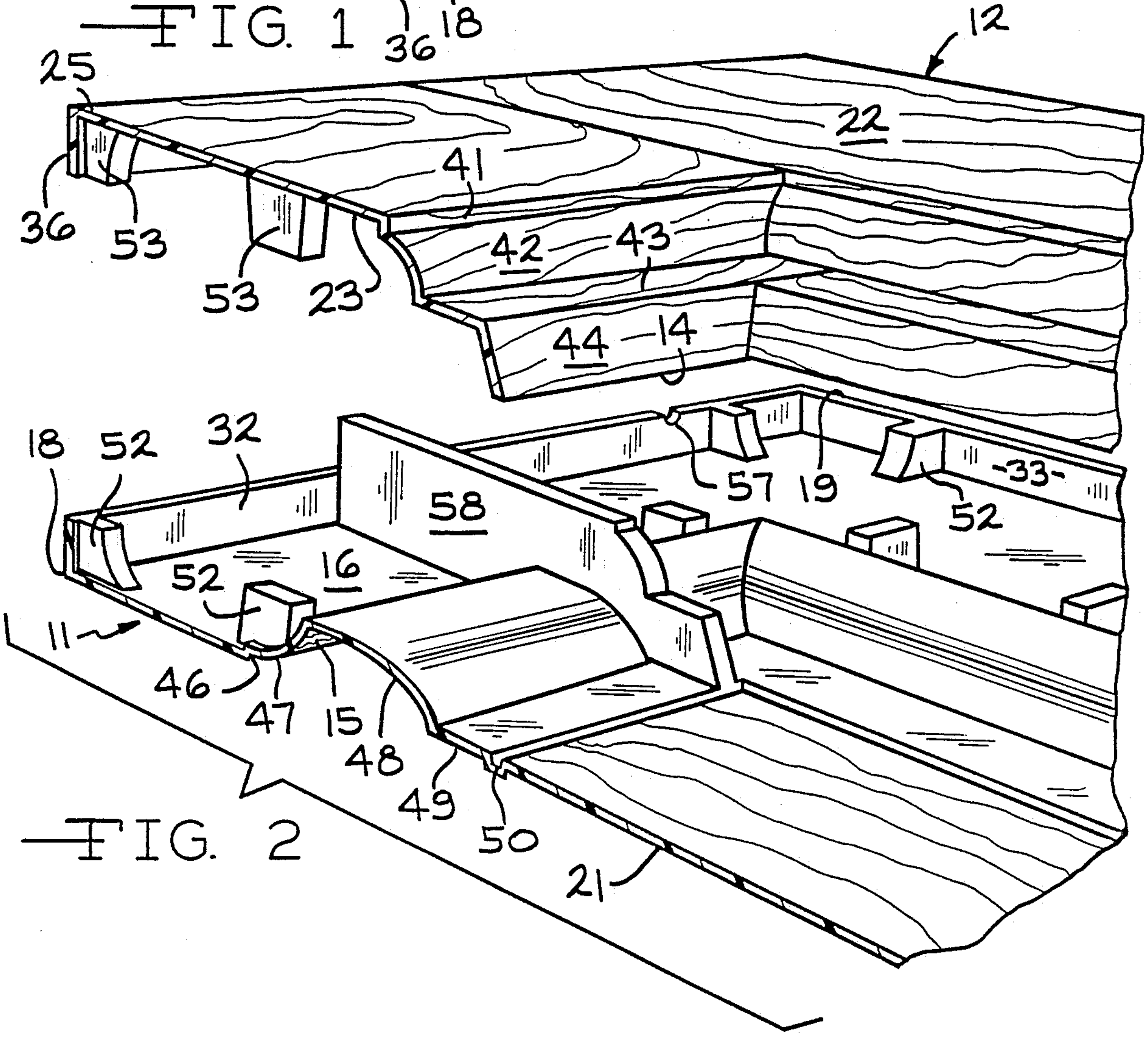
FIG. 2 is an exploded fragmentary perspective view of one embodiment of a compression molded door assembly according to the present invention.

At least one of the skins, the one designated by the reference numeral 12 in FIG. 2, is molded with one or more central openings 14.

The door assembly has one or more central panels 21. In the embodiments shown in FIGS. 2–6, the central panel 21 is shown as being an integral part of the compression molded skin 11. In the embodiments shown in FIGS. 7–10, the compression molded door is provided with a central panel 21' which is molded separately from either of the skins 11' or 12' and is secured to the skins during the assembly operations.

Each of the skins 11 (including the panel 21) and 12 in the embodiments of FIGS. 1–6 and the panel 21' and skins 11', 12' in the embodiment of FIGS. 7–10, is a compression molded sheet molding compound (SMC) unit which includes 15% to 40% fibrous glass reinforcement, by weight, and 10% to 40% inert material filler, by weight, in the molding resin. Unsaturated polyester polymers blended with vinyl monomers such as styrene are molding resins that may be cured under heat and pressure form the thermoset compression molded skins. The molding resins include unsaturated polyester resin compositions and modifications as disclosed in, for example, U.S. Pat. Nos. 3,772,241 and 3,883,612.

The inert filler may be for examples, calcium carbonate or aluminum trihydrate. In some embodiments, the material may also include ultraviolet stabilizers and fire retardant additives in the composition.

Each of the skins 11 (including panel 21), 12, 11', 12' and panel 21' have a thickness of between 0.050 inch and 0.120 inch. The present embodiment has a skin and panel thickness of 0.070 inch.

Referring to FIGS. 1–6, the compression molded skin 11 has an outer surface 15, an inner surface 16, top and bottom edges 17, 18 and opposed side edges 19, 20.

Formed as an integral part of compression molded skin 11 are one or more panels 21.

Similarly, the compression molded skin 12 has an outer surface 22, an inner surface 13, a top edge 24, a bottom edge 25 and side edges 26, 27.

The outer surfaces 15 and 22 of the skins 11 and 12, both surfaces of the panel 21 and both surfaces of the separately molded panel 21' include a molded wood grain texture. The texture is important and simulates from a texture viewpoint and a graining viewpoint a wood door. The texture on the outer surfaces 15 and 22 and both surfaces of each of the panels 21 and 21' is between 0.003 inch and 0.009 inch in depth. Such surfaces are essentially devoid of glass fibers for a predetermined depth of a least 0.005 inch. The predetermined depth, where such surfaces are essentially devoid of glass fibers, is normally between 0.005 inch and 0.009 inch.

While the inner surface 16 and 23 of the skins 11 and 12 may also have a defined pattern or random texture molded into the skin, this is not essential to the invention.. Each of the edges 17, 18, 19 and 20 of the compression molded skin 11 is provided with an integral edge member 31, 32, 33 and 34, which extend outwardly from the edges 17, 18, 19 and 20, respectively, of the door skin 11. Similarly, integral edge members 35, 36, 37 and 38 extend outwardly from the edges 24, 25, 26 and 27, respectively, of the door skin 12.

Figure 3:
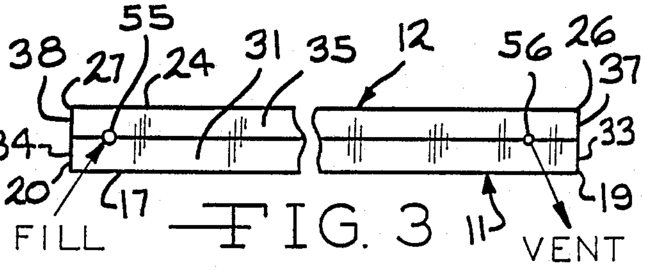
FIG. 3 is a top view of the compression molded door assembly of the present invention showing filling and venting apertures for introducing insulation.
Figure 5:
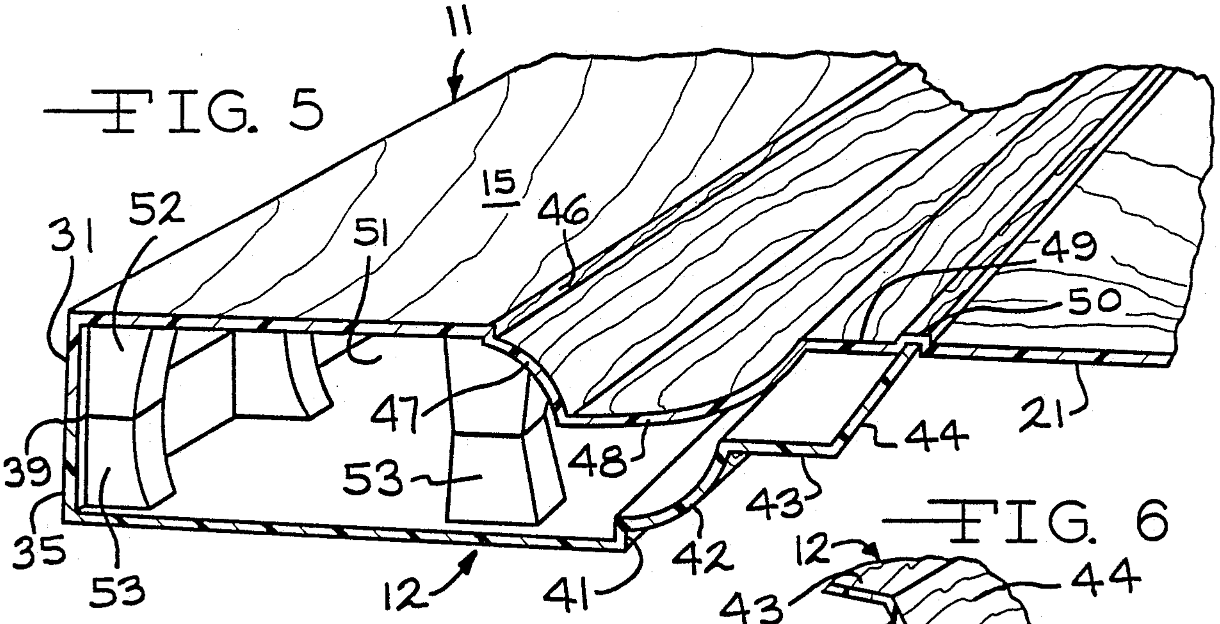
FIG. 5 is a view similar to FIG. 2 but with the skins reversed and showing the compression molded skins joined to one another.

As shown in FIGS. 1, 3 and 5, the door skins 11 and 12 are joined around the periphery by a butt joint 39 formed by the abutting ends of the opposing integral edge members 31, 35 at the top, 32, 36 at the bottom, opposing edge members 33, 37 along one side and 34, 38 along the other side. If desired, instead of a butt joint, a lap joint may be provided. A wide variety of means well-known in the art may be utilized for adhering the respective members forming the joints.

As will be appreciated, in addition to joining the door skins around the periphery at the joint provided by the abutting edge members, it is necessary that the skins be joined around the edge of the opening 14. In the embodiment shown in FIGS. 1-5, the skin 12 is provided with a contoured area which extends from the plane defined by outer surface 22 toward the opposing skin 11 in a series of interconnected segments 41, 42, 43 and 44 which are designed to provide an appearance similar to that of a wood door having a central panel section of reduced thickness. The free end of the final segment 44 defines the periphery of the opening 14.

Similarly, the other skin 11 is provided with a similar contoured area having segments 46, 47, 48 and 49 and ending in a grooved section 50 connecting the final segment 49 to the panel 21. The grooved section 50 is sized and so configured to receive the free end of the segment 44 of skin 12 which free end defines the periphery of opening 14. Adhesives such as thermosetting contact adhesive may be utilized for adhering the free end of segment 44 in the groove of the grooved section 50.

As can be readily seen from FIG. 5, such sealing along with the butt joint 39 provides a chamber 51 into which foam or other type of core may be positioned.

In order to provide additional rigidity to the door assembly, the skin 11 is provided with a plurality of braces 52 and the skin 12 is provided with a plurality of braces 53. The braces 52 and 53 are positioned in desired locations around the periphery and inwardly from the periphery toward the segments 41 of skin 12 and segment 46 of skin 11. Additionally, each of the braces 52 of skin 11 is positioned to be in alignment with a corresponding brace 53 of skin 12 when the skins 11 and 12 are joined. The length of the respective braces 52 and 53 are such that each brace 52 will abut a corresponding brace 53.

Figure 4:
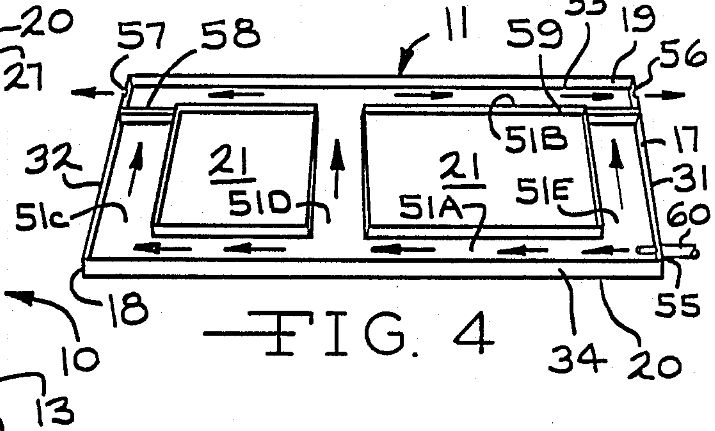
FIG. 4 is a schematic perspective view of the interior of one of the compression molded skins.

Referring now to FIGS. 3 and 4, there is shown means for introducing foamable plastic or other type of foamable material into the chamber 51 to form a core or insulation. FIG. 3 shows the skins 11 and 12 assembled to form the door assembly as viewed from the top. FIG. 4 is a schematic cut away showing only the skin 11 with diagrams showing the construction and flow path desired for flowing foamable plastic core material into the chamber 51. The top of the door assembly is provided with an inlet aperture 55 and an venting aperture 56 formed by matching cut-outs in the abutting integral edge members 31 and 35. The inlet aperture 55 is positioned adjacent the side of the door assembly formed by abutting integral edges 34 and 38 so that it is aligned with a passageway 51A of chamber 51. In addition to the venting aperture 56 in the top of the door assembly, there is also provided a venting aperture 57 in the bottom. Both of the venting apertures 56 and 57 are near the opposite side of the door from the inlet aperture 55 namely, that formed by abutting integral edges 33 and 37 so that they are aligned with passageay 51B of chamber 51.

As can be seen from FIG. 4, the door assembly of the FIG. 1, 4 embodiment has two panels 21 and three cross passageways 51C, 51D and 51E extending between the passageways 51A and 51B.

The skin 11 is provided with a dam member 58 positioned near the junction between passageway 51C and 51B and with a dam member 59 positioned near the junction between passageways 51E and 51B.

The height and contour of the dams 58 and 59 are such as to mate with the inner surface of the skin 12 to substantially close direct communication between passageway 51C and 51B and between passageway 51E and 51B. If desired, the height of the dams 58 and 59 may be the same as the height of the braces 52. In that event, corresponding dams may be positioned in alignment therewith in the other skin 12 to close the end of each of the cross passageways 51C and 51E adjacent passageway 51B.

As shown schematically in FIG. 4, a tube 60 may be inserted in the inlet aperture 55 and foamable plastic material introduced therethrough. The foamable plastic material is introduced after the skins 11 and 12 have been joined. The foamable plastic material will follow the paths of least resistance through passageways 51A, 51C, 51D and 51E and from passageway 51D only into passageway 51B. The flow of such plastic material through passageways 51C and 51E will be stopped by the respective dams 58 and 59 positioned at the end of each such passageway. The foamable plastic material flowing through passageway 51D will flow into passageway 51B, flowing in both directions. Foamable plastic material reaching both of the respective venting apertures 56 and 57 will serve as an indication that the chamber 51 is completely filled and the introduction of such plastic material will be stopped. The dams 58 and 59 function to insure that all portions of the chambers 51 are substantially filled so that there are no significant voids in the foamable plastic in the chamber 51 when the foamable plastic material reaches both of the venting apertures. If the dams were not present, it is possible that foamable plastic material could vent from both of the apertures 56 and 57 even though some portions of the chamber were not completely filled.

Although it is preferred for aesthetic reasons that the inlet aperture 55 and the venting 56 and 57 be positioned only in the top and bottom, it is possible to position such apertures at other locations such as the sides without departing from the scope of the invention.

Figure 6:
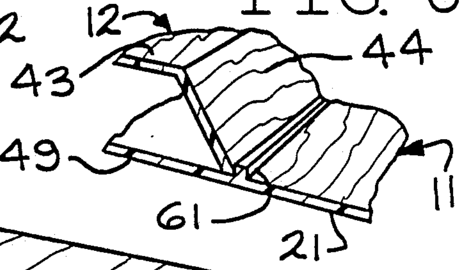
FIG. 6 is a fragmentary perspective view showing another type of joint between the two skins in the area of the central panel.

Referring to FIGS. 6, there is shown a modified embodiment in which no grooved section is provided between the segment 49 and the panel 21. Rather, there is provided a raised abutment 61 against which the lower edge of the segment 44 of skin 12 may be joined.

Figure 7:
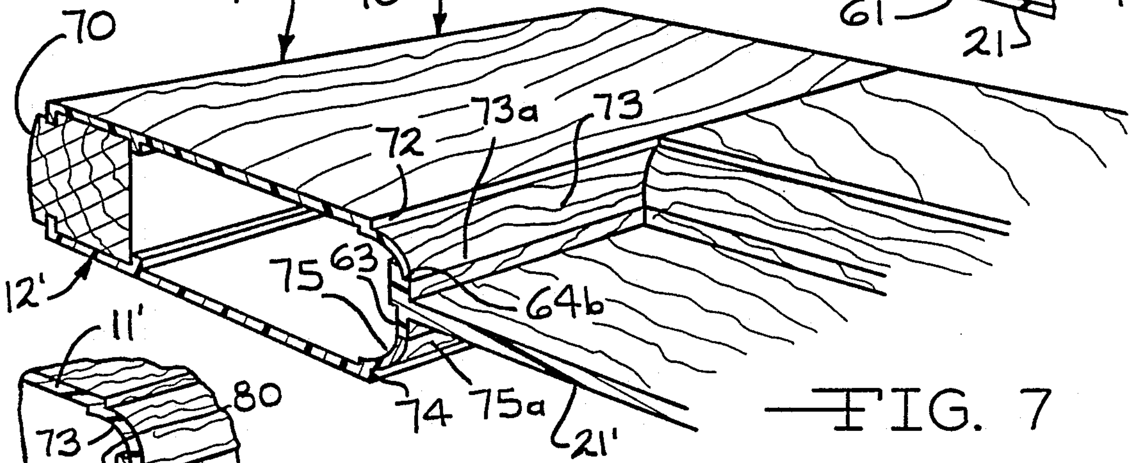
FIG. 7 is fragmentary perspective view of another embodiment of the compresson molded door assembly of the present invention in which the central panel is molded separate from the skins and showing the joint between the panel and the skins.

Referring now to FIGS. 7–10, there is provided a modified door assembly 10' having a panel 21' which is separately molded and which has texture and graining of a wood door. The panel 21' is provided around its periphery with a downwardly extending wall member 63 and an upwardly extending wall member 64. The upwardly extending wall member 64 has a lower portion **64*a*, the inner surface of which is aligned with the inner surface of the downwardly extending wall member 63. The upwardly extending wall member 64 is provided with a ledge 64*b* and an upper portion 64*c* which is offset outwardly from the inner surface of the lower portion 64*a*. The downwardly extending wall member 63 is provided with a plurality of tabs 65 the inner surfaces of which are aligned with its outer surface 63*a*. The tabs extend downwardly beyond the end of the wall member 63. As shown in FIG. 7, the door assembly 10 may be provided with a wood style member 70 with the opposing skins 11' and 12' joined thereto by means wellknown in the art. In the embodiment of FIG. 7 the skin 11' and 12' extend inwardly from each of their respective edges to a contoured area consisting of a step 72 and arcuate segment 73 for skin 11' and a step 74 and arcuate segment 75 for skin 12'. The arcuate segment 73 terminates at free end 73*a* and the arcuate segment 75 terminates at free end 75*a***.

When the skins 11' and 12' are joined to the style 70 with the panel 62 positioned therebetween, the free end **73*a* will abut the stepped portion 64*b* of panel 21'. The upper portion 64*c* of the upwardly extending wall member is positioned behind the lower end of the arcuate segment 73. The downwardly extending wall member 63 is positioned in abutting relationship with the free end 75*a* of the arcuate segment 75 of skin 12' and the tabs 65 are positioned behind the end of the arcuate segment 75. Thus, the panel 62 is firmly engaged between the respective skins 11' and 12'. This construction provides a particularly effective seal to prevent the foamable plastic material from escaping from the joints formed by the free end 73*a* abutting the stepped portion 64*b* and the free end 75*a* abutting the downwardly facing end of wall member 63**.

Figure 10:
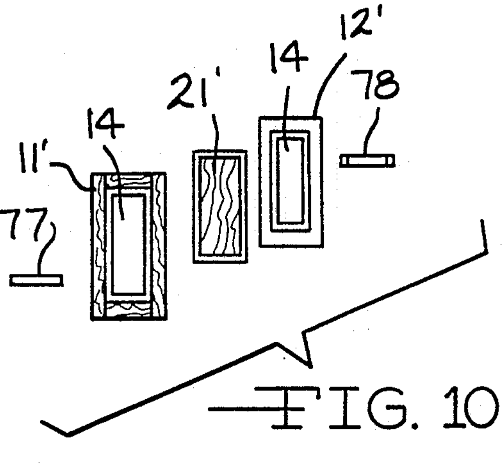
FIG. 10 is an exploded schematic view of the embodiment shown in FIG. 7.

As can be seen from the schematic exploded view of FIG. 10, each of the skins 11' and 12' is provided with an opening 14' in which the panel 21' is positioned. In contrast to the previous embodiment, the skins 11' and 12' are provided with a single large opening 14 rather than a pluraliy of smaller openings. In this embodiment, if desired, cross members 77 and 78 may be affixed to each side of the panel 21' for decorative purposes.

Figure 9:
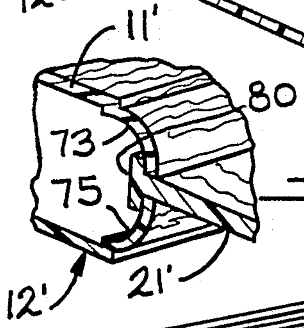
FIG. 9 is a fragmentary perspective view of a panel with a modified edge showing the joint between it and the skins.
Figure 8:
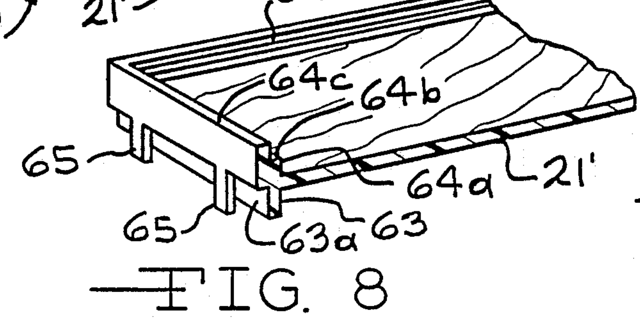
FIG. 8 is a fragmentary perspective view of the panel of FIG. 7.

In the embodiment of FIG. 9 the panel 21' is provided with a wall 80 of uniform thickness the entire portion of which is behind the ends of the respective arcuate segments 73 and 75. In this embodiment, the free ends of arcuate segments 73 and 75 will abut the opposite surfaces of panel 21'.

It can be readily seen that a door of the present invention can be easily and economically assembled with the internal components snugly retained between the respective skins to form a functional and economical door assembly.

While the present invention has been disclosed with respect to the embodiments, it is understood that various changes and modifications may be made to the compression molded door assembly without departing from the scope of the following claims.

What I claimed is:

1. A method of forming a door assembly having members joined to form a chamber consisting of a series of passageways, an inlet aperture and a plurality of venting apertures and a foam core in said chamber comprising the steps of introducing foamable material in flowable form into one of said passageways through said inlet aperture, directing the flow of said foamable material through said passageway, blocking the flow of said foamable material in at least one passageway to selectively direct the flow of foamable material through said passageways and prevent foamable material from flowing out of all of the venting apertures prior to the chamber being completely filled with said foamable material, and causing said foamable material to form said foam core.

2. A method of forming a door assembly having top, bottom and a pair of opposed side edges and having (a) skin members joined to form a chamber consisting of a pair of spaced apart longitudinal passageways, one adjacent each of said side edges, and at least three transverse passageways, each of said transverse passageways spanning the distance between said longitudinal passageways, one transverse passageway being an upper passageway adjacent said top edge, another transverse passageway being a lower passageway adjacent said bottom edge and all other transverse passageways positioned between said upper and said lower passageways, and (b) a foam core in said chamber, comprising the steps of:

introducing foamable material in flowable form into one of said longitudinal passageways;

selectively directing the flow of said foamable material through one of said longitudinal passageways into each of said transverse passageways;

blocking the flow of said foamable material in both of the upper and lower transverse passageways in the area adjacent the respective junctures thereof with the other of said longitudinal passageways to prevent foamable material from flowing from said upper and lower transverse passageways to the other of said longitudinal passageways while permitting the flow of said foamable material through at least one of the other of said transverse passageways into the other of said longitudinal passageways;

venting excess foamable material from opposite ends of the other of said longitudinal passageways;

stopping the introduction of said foamable material when said excess foamable material vents from both of said opposite ends; and causing said foamable material to form said foam core.

3. A method of forming a door assembly having top, bottom and a pair of opposed side edges and having (a) skin members joined to form a chamber consisting of a pair of spaced apart longitudinal passageways extending between said top and bottom edges, one adjacent each of said side edges, and three transverse passageways, each of said transverse passageways spanning the distance between said longitudinal passageways, one transverse passageway being an upper passageway adjacent said top edge, another transverse passageway being a lower passageway adjacent said bottom edge and the other transverse passageway positioned between and parallel to said upper and said lower passageways, (b) a foam core in said chamber, (c) inlet means communicating with one of said longitudinal passageways, and (d) venting means positioned at opposite ends of the other of said longitudinal passageways comprising the steps of:

introducing foamable material in flowable form through said inlet into and through said one longitudinal passageway into each of said transverse passageways;

blocking the flow of said foamable material in both of the upper and lower transverse passageways in the areas, respectively, of each of their junctures with the other of said longitudinal passageways to prevent foamable material from flowing from said upper and lower transverse passageways to the other of said longitudinal passageways while permitting the flowing of said foamable material through the other of said transverse passageways into the other of said longitudinal passageways;

venting excess foamable material through said venting means;

stopping the introduction of said foamable material into the inlet means when excesss foamable material vents from both of said venting means; and causing said foamable material to form said foam core.

4. A method of forming a door assembly having top, bottom and a pair of opposed side edges and having (a) skin members joined to form a chamber consisting of a pair of spaced apart longitudinal passageways, one adjacent each of said side edges, and at least three transverse passageways, each of said transverse passageways spanning the distance between said longitudinal passageways, one transverse passageway being an upper passageway adjacent said top edge, another transverse passageway being a lower passageway adjacent said bottom edge and all other transverse passageway positioned between said upper and said lower passageways, and (b) a foam core in said chamber comprising steps of:

introducing foamable material in flowable form into one of said longitudinal passageways;

directing the flow of said foamable material through said one longitudinal passageway into each of said transverse passageways;

blocking the flow of said foamable material in at least one of the upper and lower transverse passageways in the area adjacent the juncture thereof with the other of said longitudinal passageways to selectively direct the flow of said foamable material through said passageways to prevent foamable material from flowing from the blocked transverse passageway to the other of said longitudinal passageways while permitting the flow of said foamable material through at least one of the other of said transverse passageways into the other of said longitudinal passageways;

venting excess foamable material from opposite ends of the other of said longitudinal passageways;

stopping the introduction of said foamable material when said excess foamable material vents from both of said opposite ends; and causing said foamable material to form said foam core.

* * * * *